(12) United States Patent
Siswick et al.

(10) Patent No.: US 11,305,732 B2
(45) Date of Patent: Apr. 19, 2022

(54) VEHICLE ACCESS SYSTEM

(71) Applicant: JAGUAR LAND ROVER LIMITED, Coventry (GB)

(72) Inventors: Howard Siswick, Warwickshire (GB); Mohammed Khan, Warwickshire (GB)

(73) Assignee: Jaguar Land Rover Limited, Coventry (GB)

( * ) Notice: Subject to any disclaimer, the term of this patent is extended or adjusted under 35 U.S.C. 154(b) by 0 days.

(21) Appl. No.: 16/605,583

(22) PCT Filed: Mar. 30, 2018

(86) PCT No.: PCT/EP2018/058314
§ 371 (c)(1),
(2) Date: Oct. 16, 2019

(87) PCT Pub. No.: WO2018/192768
PCT Pub. Date: Oct. 25, 2018

(65) Prior Publication Data
US 2020/0122686 A1 Apr. 23, 2020

(30) Foreign Application Priority Data
Apr. 19, 2017 (GB) ...................................... 1706191

(51) Int. Cl.
*B60R 25/24* (2013.01)
*G01S 11/06* (2006.01)

(52) U.S. Cl.
CPC .......... *B60R 25/246* (2013.01); *B60R 25/241* (2013.01); *B60R 25/245* (2013.01);
(Continued)

(58) Field of Classification Search
CPC ... B60R 25/246; B60R 25/241; B60R 25/245; B60R 2325/101; B60R 2325/105;
(Continued)

(56) References Cited

U.S. PATENT DOCUMENTS 6,538,560 B1 3/2003 Strobbe et al.
10,328,900 B1 * 6/2019 Yakovenko ............. B60R 25/24
(Continued)

FOREIGN PATENT DOCUMENTS

DE 19939064 A1 2/2001
DE 102005039562 A1 3/2007
(Continued)

OTHER PUBLICATIONS

International Search Report and Written Opinion, PCT/EP2018/058314, dated May 25, 2018.
(Continued)

*Primary Examiner* — Edwin C Holloway, III
(74) *Attorney, Agent, or Firm* — McCoy Russell LLP

(57) ABSTRACT

A method of operating an access system for a vehicle, the method comprising: 5 scanning for a first communication signal from a first communications device using a first communication channel; and initiating a vehicle access process in dependence on detecting the first communication signal from the first communications device; wherein the vehicle access process comprises: comparing a received signal strength indication, RSSI, of the received first communication signal to a predetermined 10 threshold signal strength value; sending a challenge signal for a second communications device using a second communication channel in the event that the RSSI of the received first communication signal exceeds the threshold signal strength value; and controlling the vehicle access system in dependence on a response signal received from the second communications device, the response signal having been 15 sent in response to the challenge signal.

19 Claims, 6 Drawing Sheets

(52) U.S. Cl.
CPC ......... *G01S 11/06* (2013.01); *B60R 2325/101* (2013.01); *B60R 2325/105* (2013.01); *B60R 2325/205* (2013.01)

(58) Field of Classification Search
CPC ... B60R 2325/205; B60R 25/01; B60R 25/00; B60R 25/2009; G07C 2009/00198; G07C 2009/00365; G07C 2009/00388; G07C 2009/00404; G07C 2209/63; G07C 2009/00396; G07C 9/00309; G07C 2009/00603; G07C 2009/00769; G07C 9/28; G07C 2009/00793; G07C 2009/00984; G07C 2209/61; G01S 11/06; G06K 7/10128
USPC .................................. 340/5.61, 5.72, 426.36
See application file for complete search history.

(56) References Cited

U.S. PATENT DOCUMENTS

| | | | |
|---|---|---|---|
| 2007/0200672 A1 | 8/2007 | McBride et al. | |
| 2011/0257817 A1* | 10/2011 | Tieman | G07C 9/00309 701/2 |
| 2014/0114504 A1* | 4/2014 | Yamashita | B60R 25/40 701/2 |
| 2014/0188348 A1* | 7/2014 | Gautama | B60W 10/30 701/48 |
| 2015/0161834 A1* | 6/2015 | Spahl | H04W 4/021 340/5.61 |
| 2015/0363988 A1* | 12/2015 | Van Wiemeersch | H04M 1/11 455/557 |
| 2016/0148450 A1* | 5/2016 | Ohshima | H04W 12/08 340/5.61 |
| 2017/0106834 A1* | 4/2017 | Williams | G07C 9/28 |
| 2017/0200334 A1 | 7/2017 | Buttolo et al. | |
| 2017/0232933 A1* | 8/2017 | Nishidai | B60R 25/24 340/5.61 |

FOREIGN PATENT DOCUMENTS

| | | |
|---|---|---|
| DE | 102014018057 A1 | 6/2016 |
| EP | 1128007 A2 | 8/2001 |
| EP | 1867536 A1 | 12/2007 |
| FR | 3006794 A1 | 12/2014 |
| GB | 2471163 A | 12/2010 |
| GB | 2558589 A | 7/2018 |
| WO | 03005309 A1 | 1/2003 |
| WO | 2015062832 A1 | 5/2015 |

OTHER PUBLICATIONS

Search and Examination Report, GB1706191.2, dated Sep. 20, 2017.
Search and Examination Report, GB1805332.2, dated Sep. 17, 2018.

* cited by examiner

VEHICLE ACCESS SYSTEM

CROSS-REFERENCE TO RELATED APPLICATIONS

This application is a 371 of International Application No. PCT/EP2018/058314, filed Mar. 30, 2018, which claims priority to GB Patent Application 1706191.2, filed Apr. 19, 2017, the contents of both of which are incorporated by reference herein in their entirety.

TECHNICAL FIELD

The present disclosure relates to a vehicle access system and particularly, but not exclusively, to a keyless access/entry system for a vehicle such as a motor vehicle. Aspects of the invention relate to a method of operating an access system for a vehicle, to a control unit arranged to control an access system for a vehicle, to an access system for a vehicle and to a vehicle.

BACKGROUND

It is known to provide passive entry and passive starting (PEPS) systems for motor vehicles. The vehicle user typically carries a key fob which can communicate with a base station in the vehicle. The key fob remains in a very low power state to conserve its internal battery. Upon receipt of an initiating trigger (for example when a vehicle door handle is operated), the base station emits a powerful Low Frequency (LF) electromagnetic field, the energy from which wakes up the key fob using a charge pump technique. Once awake, the key fob can then respond to a challenge over a Radio Frequency (RF) communications channel. The key fob sends a response signal which is validated by the base station to authenticate the key fob. If the key fob is authenticated, the base station actuates a door lock to unlock the door.

The energy required from the vehicle to generate the LF field is considerable, which is why a trigger is universally employed to begin the process. Moreover, the consequence of using an initiating trigger is that the whole sequence of validating the key fob's identity and unlocking the vehicle has to be extremely short to avoid a customer experiencing a delay in the vehicle's response. To help avoid any such delay, a fast-release motor can be provided to unlock the door to provide seamless operation as if the vehicle was already unlocked.

At least in certain embodiments, the present invention attempts to address or mitigate at least some of the shortcomings associated with known vehicle access systems.

SUMMARY OF THE INVENTION

According to an aspect of the present invention there is provided a method of operating an access system for a vehicle, the method comprising: scanning for a first communication signal from a first communications device using a first communication channel; and initiating a vehicle access process in dependence on detecting the first communication signal from the first communications device; wherein the vehicle access process comprises: comparing a received signal strength indication, RSSI, of the received first communication signal to a predetermined threshold signal strength value; sending a challenge signal for a second communications device using a second communication channel in the event that the RSSI of the received first communication signal exceeds the threshold signal strength value; and controlling the vehicle access system in dependence on a response signal received from the second communications device, the response signal having been sent in response to the challenge signal.

In order to at least partially address shortcomings identified with prior art systems, the present invention utilises two communications devices to manage the vehicle access process. For example, in an arrangement where a vehicle owner uses a smart device (such as a smart phone, tablet or smart watch) this may be used as the first communications device above. Such smart devices are provided with Bluetooth® functionality which is an energy efficient communications solution and so the use of such a system as part of the access process will only have limited impact to the battery of the vehicle (since a corresponding Bluetooth® transceiver/receiver on the vehicle would not drain too much energy from the vehicle's battery).

Optionally, the first communications channel may be monitored to determine the likely approach of a vehicle user and, the vehicle may then switch to the second, different, communications channel (e.g. a Low Frequency system) to search for the presence of the second communications device (e.g. a traditional key fob). It is noted that this arrangement has the benefit that vehicle users that do not possess a first communications device may gain vehicle access in the normal manner, e.g. by using the existing vehicle key fob.

Optionally, the first communication signal comprises a signal sent via Bluetooth®. It is noted that the term "Bluetooth" in this context includes all Bluetooth® generations, including the Bluetooth® Low Energy system. It is noted that use of Bluetooth® as the first communications channel allows a "seeking" functionality to be performed by the vehicle for the first communications device with minimal power consumption.

In alternative embodiments, the first communications signal may comprise a signal sent by WiFi.

Optionally, the first communications device is a mobile communications device.

Optionally, the second communications device is configured to allow a user to gain access to a vehicle. For example, the second communications device may be a key fob device.

Optionally, the method comprises identifying a device identifier for the first communications device from the first communication signal and checking if the device identifier corresponds with that of an approved device. Optionally, the method comprises turning on a transmitter for transmitting the challenge signal via the second communication channel in the event that the first communications device is an approved device. The transmitter may comprise, or consist of, a Radio Frequency (RF) transmitter and the second communications channel may comprise, or consist of, an RF channel. Optionally, the transmitter comprises a Low Frequency (LF) transmitter and the second communications channel comprises an LF channel.

Optionally, the method comprises sending a signal strength request signal to the first communications device over the first communication channel and receiving a signal strength confirmation communication signal from the first communications device over the first communications channel, the signal strength confirmation communication signal comprising a signal strength value of the signal strength request signal as received at the first communications device. The method may comprise comparing the signal strength value to a predetermined threshold signal strength value. The method may comprise sending the challenge signal for the second communications device in the event that the signal strength value exceeds the threshold signal strength value.

Optionally, the vehicle is provided with multiple antennas for receiving communication signals sent over the first communication channel, the method comprising comparing the signal strength of signals received from the first communications device at two or more of the antennas to determine at least one of a relative position/location of the first communications device with respect to the vehicle and an approach vector for the first communications device. Optionally, the method comprises turning on a transmitter for transmitting the challenge signal on the side of the vehicle that the first communications device is approaching.

Optionally, the method comprises cancelling the vehicle access process in the event that no response signal is received from the second communications device.

Optionally, the vehicle access process comprises unlocking the vehicle (e.g. unlocking a door, a number of doors, a vehicle boot or stowage compartment).

Optionally, the method comprises determining that the first communications device is moving away from the vehicle in dependence on one or more changes in the signal strength of signals received over the first communications channel from the first communications device. The method may comprise turning on an RF transmitter in order to determine if the second communications device is moving away from the vehicle.

Optionally, the method comprises locking the vehicle in the event that the first and/or second communications devices have left the vicinity of the vehicle. For example, the vehicle may be locked when the second communications device has left the detection area of antenna on the vehicle (in the case of an LF antenna on the vehicle this may correspond to locking the vehicle when the key fob is more than about one metre from the vehicle). Alternatively, the vehicle may determine the distance to the first communications device as it departs the vehicle and may lock the vehicle when the first communications device exceeds a predetermined distance from the vehicle. The distance from the vehicle may be determined from the signal strength of first communications signals received from the first communications device.

Optionally, the vehicle access process comprises locking the vehicle.

Optionally the method comprises sending a locking status message to the first communications device over the first communication channel. Such a locking status message may comprise a confirmation that the vehicle is locked or a message stating that the locking process has failed.

Optionally, the first and second communications devices are located within a single user device.

Optionally, the first communications device is located in a first user device and the second communications device is located in a second user device.

According to an aspect of the present invention there is provided a control unit arranged to control an access system for a vehicle, the control unit comprising: one or more inputs for receiving a first communication signal from a first communications device and a second communication signal from a second communications device; a processor arranged to manage a vehicle access process; and an output arranged to output vehicle access control signals; wherein the processor is arranged to: scan for a first communication signal from a first communications device using a first communication channel; initiate a vehicle access process in dependence on detecting the first communication signal from the first communications device, the vehicle access process comprising comparing a received signal strength indication, RSSI, of the received first communication signal to a predetermined threshold signal strength value and, in the event that the RSSI of the received first communication signal exceeds the threshold signal value, sending from the output a challenge signal for a second communications device using a second communication channel; and wherein the output is arranged to output a vehicle access control signal to control the vehicle access system in dependence on a response signal received from the second communications device, the response signal having been sent in response to the challenge signal.

According to a further aspect of the present invention there is provided an access system for a vehicle comprising a control unit according to an above aspect of the present invention, a first antenna arranged to operate over the first communication channel and a second antenna arranged to operate over the second communication channel.

According to a further aspect of the present invention there is provided a vehicle comprising a control unit or an access system according to an above aspect of the present invention.

According to a further aspect of the present invention there is provided a computer program product comprising instructions which, when a program of the program product is executed by a computer, cause the computer to carry out the method of the above aspect of the present invention. The computer program product may be downloadable from a communication network and/or stored on a computer-readable and/or microprocessor-executable medium.

According to a further aspect of the present invention there is provided a non-transitory computer-readable medium having stored thereon the computer program product of a foregoing aspect of the invention.

In an embodiment of the abovementioned control unit, the processor comprises an electronic processor having an electrical input for receiving said communications signals; and an electronic memory device electrically coupled to the electronic processor and having instructions stored therein, wherein the processor is configured to access the memory device and execute the instructions stored therein such that it is operable to detect that the vehicle is being approached by a suitable (e.g. Bluetooth®-enabled) device based on a value of the communications signals received at the electrical input; and determine that the device is known and command the vehicle entry system to perform one or more actions.

According to a further aspect of the present invention there is provided a method of operating an access system for a vehicle, the method comprising: scanning for a first communication signal from a first communications device using a first communication channel; and initiating a vehicle access process in dependence on detecting the first communication signal from the first communications device; wherein the vehicle access process comprises establishing a second communication channel in dependence on the first communication channel; and controlling the vehicle access system in dependence on communication signals received from a second communications device over the second communication channel.

In an embodiment, a handshaking process between the first communications device and the vehicle may take place over the first communications channel in order to establish the parameters for communication over the first communications channel. In response to the first communications channel being set up the second communications channel between the vehicle and the second communications device may then be set up and communications within this second communications channel may be used to manage the vehicle access process.

According to a further aspect of the present invention there is provided a method of operating an access system for a vehicle, the method comprising: scanning for a first communication signal from a first communications device using a first communication channel; and initiating a vehicle access process in dependence on detecting the first communication signal from the first communications device; wherein the vehicle access process comprises sending a challenge signal for a second communications device using a second communication channel; and controlling the vehicle access system in dependence on a response signal received from the second communications device, the response signal having been sent in response to the challenge signal.

Optionally, the method comprises comparing a received signal strength indication (RSSI) of the received first communication signal to a predetermined threshold signal strength value. In this manner the distance between the first communications device and the vehicle may effectively be determined by measuring the signal strength of the communications signal that is received when scanning for the first communications device. The method may comprise sending the challenge signal for the second communications device in the event that the RSSI of the received first communication signal exceeds the threshold signal strength value.

According to an aspect of the present invention there is provided a control unit arranged to control an access system for a vehicle, the control unit comprising: one or more inputs for receiving a first communication signal from a first communications device and a second communication signal from a second communications device; a processor arranged to manage a vehicle access process; and an output arranged to output vehicle access control signals; wherein the processor is arranged to: scan for a first communication signal from a first communications device using a first communication channel; initiate a vehicle access process in dependence on detecting the first communication signal from the first communications device, the vehicle access process comprising sending from the output a challenge signal for a second communications device using a second communication channel; and wherein the output is arranged to output a vehicle access control signal to control the vehicle access system in dependence on a response signal received from the second communications device, the response signal having been sent in response to the challenge signal.

Within the scope of this application it is expressly intended that the various aspects, embodiments, examples and alternatives set out in the preceding paragraphs, in the claims and/or in the following description and drawings, and in particular the individual features thereof, may be taken independently or in any combination. That is, all embodiments and/or features of any embodiment can be combined in any way and/or combination, unless such features are incompatible. The applicant reserves the right to change any originally filed claim or file any new claim accordingly, including the right to amend any originally filed claim to depend from and/or incorporate any feature of any other claim although not originally claimed in that manner.

BRIEF DESCRIPTION OF THE DRAWINGS

One or more embodiments of the invention will now be described, by way of example only, with reference to the accompanying drawings, in which.

DETAILED DESCRIPTION

Figure 1:
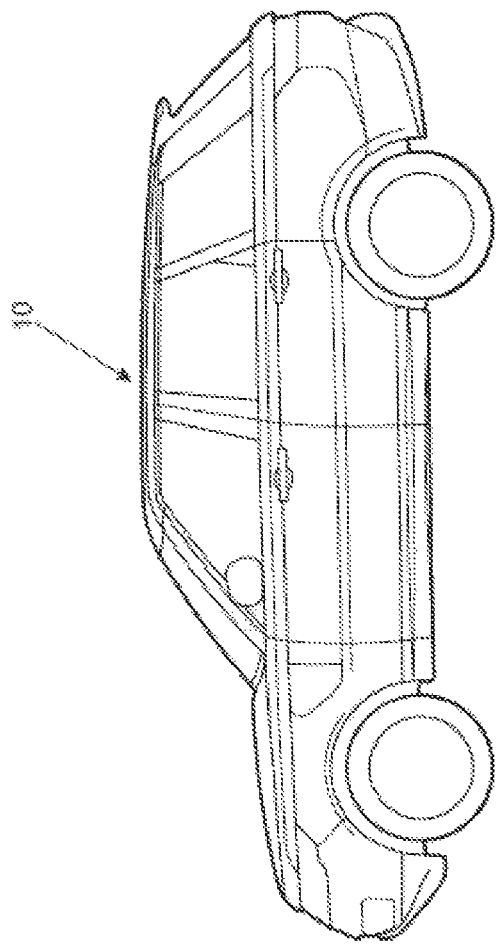
FIG. 1 illustrates a known vehicle access system.
Figure 1:
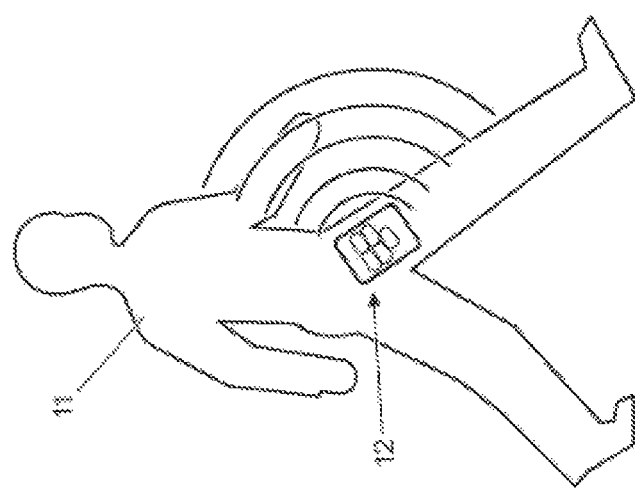
Figure 2:
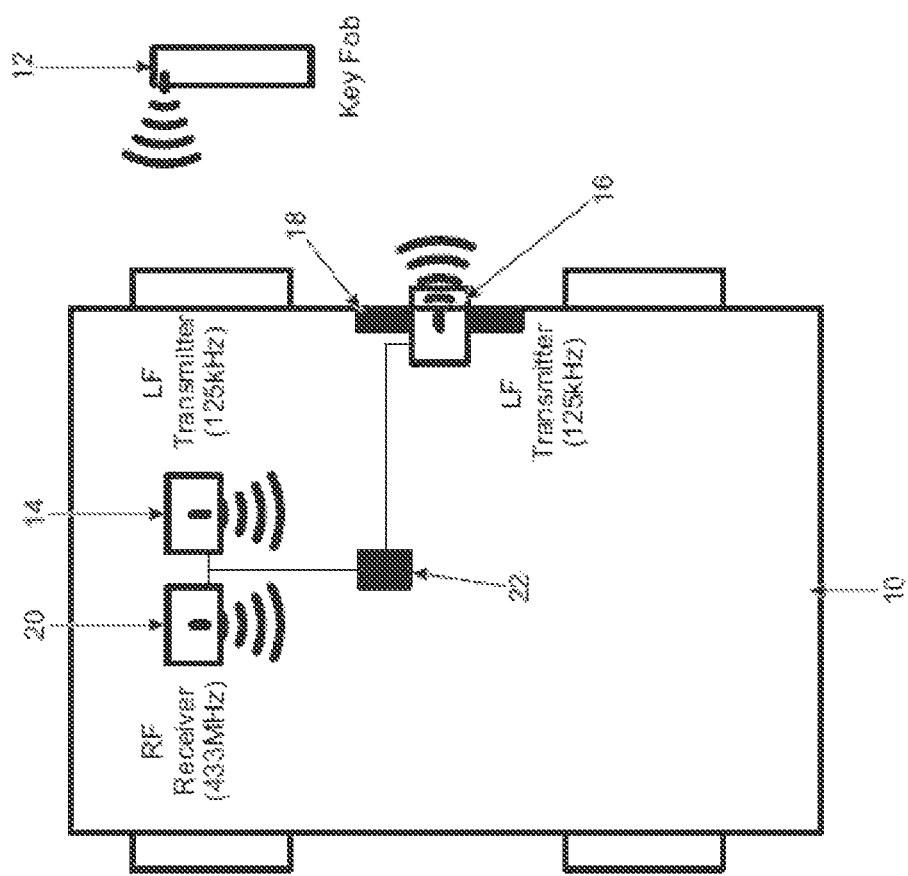
FIG. 2 shows the components of the known vehicle access system of FIG. 1.

FIGS. 1 and 2 show a vehicle 10 comprising a passive access system. As shown in FIG. 1, a vehicle user 11 carries a key fob 12 which may be used to interact with the access system (e.g. a passive entry passive start system) on board the vehicle 10 in order to gain access to the vehicle and also potentially to deploy certain vehicle systems (e.g. retracting door handles could be deployed or vehicle lights may be turned on to facilitate vehicle access) and to control certain vehicle systems as a user exits and leaves the vehicle.

Turning to FIG. 2, the vehicle 10 is shown to comprise a first low frequency (LF) transmitter 14 located in the engine compartment of the vehicle and a second LF transmitter 16 located in a door handle 18 of the vehicle. It is noted that only two transmitters 14, 16 are shown in FIG. 1 for clarity and in certain arrangements each door handle may comprise a transmitter. In other arrangements, the transmitter 14 located in the engine compartment may not be present and the passive entry system may, for example, rely on the door handle based transmitters for operation, although other locations within or on the vehicle are envisaged.

The passive access system further comprises an RF receiver 20 and a control unit 22.

The transmitters 14, 16 are arranged to output radio signals at a frequency of 125 kHz. The key fob 12 is configured to receive signals at 125 kHz and transmit signals at a frequency of 433 MHz, The RF receiver 20 is configured to receive signals at a frequency of 433 MHz.

It is noted that the above frequency values are provided by way of example only and may vary between different vehicle markets. The low frequency (LF) range, for example, is generally taken to encompass the range of 30 kHz to 300 kHz. The radio frequency (RF) range is generally taken to encompass the range of 3 kHz to 300 GHz. The RF frequency described herein is 433 MHz but the inventors are aware of, for example, other systems that operate at 315 MHz.

In a normal unlock mode of operation, a vehicle occupant 11 in possession of the key fob 12 approaches the vehicle and pulls a door handle 18. A sensor (not shown) in the door handle sends a signal to the control unit 22 which arranges for the transmitter 14, 16 to send an LF signal which is received by the key fob 12.

In response to receiving the LF signal from the vehicle 10, the key fob is arranged to send an unlock request to the vehicle on the RF signal frequency. The RF signal is received by the receiver 20 which sends the received signal to the control unit 22 which then sends a door unlock signal to the doors.

Figure 3:
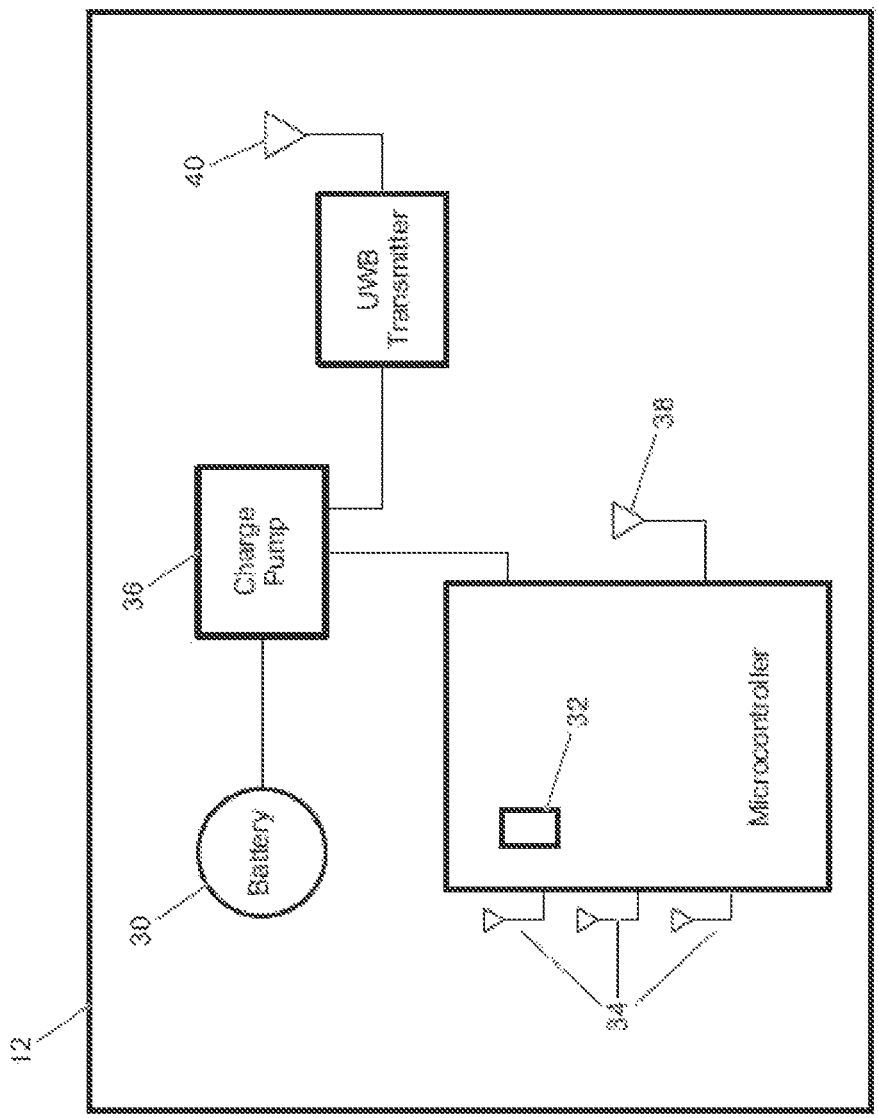
FIG. 3 shows the components of a known passive access device for use with the vehicle access system of FIGS. 1 and 2.

FIG. 3 shows the internal components of the key fob 12 in more detail. It is noted that the key fob may comprise multiple different communication components and in the example of the key fob of FIG. 3 the fob is capable of receiving and/or transmitting low frequency (LF) signals, radio frequency signals (in the form of UHF signals in the present example) and ultra-wideband signals (UWB).

The fob 12 comprises a battery 30 in the form of a known "CR2032" type battery. In normal usage, with the key fob in a dormant state when it is not being used, such a battery may provide two years of service before requiring replacement.

An LF receiver 32 comprising a number of LF antennas 34 is contained within the key fob 12. In use, LF signals received at the antennae antennas 34 are used to charge up capacitors within a charge pump 36 such that the key fob 12 can wake from its dormant state.

Once the key fob 12 is awake, an RF antenna 38 can send an unlock communication signal to the vehicle which is received by the receiver 20 on the vehicle as described above and the identity of the key fob 12 can be authenticated by the vehicle 10.

Following, or in parallel with, the vehicle unlock communications that are sent between the RF antenna 38 in the fob 12 and the receiver 20 within the vehicle 10, the key fob 12 may additionally communicate with the vehicle via an ultra-wideband signal sent from an ultra-wideband antenna 40.

The use of an UWB signal enables an additional security check to be performed in which a time-of-flight calculation is made which can determine how far the key fob 12 is from the vehicle 10. Such a time-of-flight calculation is performed in order to mitigate against relay attacks in which a third party attempts to gain entry into the vehicle by boosting the LF signal sent from the transmitters 14,16 to the key fob 12 when it is located outside a usual passive entry range of operation.

As described above, the passive entry system of FIGS. 1 to 3 operates by a user event driven trigger (for example, the pull of a door handle, activation of an exterior lock switch or press of the tailgate release button). Such a user event driven trigger results in the vehicle 10 emitting an electromagnetic Low Frequency (LF) signal/field in a region adjacent to the trigger event. The energy of this field wakes up the key fob 12 from the dormant state and causes it to respond in the prescribed manner described above using RF and potentially UWB signals, as will be understood.

The above passive access system delivers the feature of passive entry, which enables the user to gain entry to their vehicle 10 without having to physically interact with the key fob 12. Until the customer performs an action with their vehicle, the key fob remains in a very low power dormant state. However, in order to deliver enhanced features of such as approach unlocking, welcome lighting and walk away locking, the vehicle has to be able to detect and react to an approaching key fob well before user intervention is expected and additionally needs to be able to track a user's departure from the vehicle. It is noted in this context that the LF field generated by the vehicle may only extend approximately 2 metres from the vehicle.

One method to deliver this kind of enhanced functionality would be to constantly/periodically pulse the vehicle's LF antennas to generate the LF field just in case the customer's key fob comes into range. This strategy would be extremely power hungry from a vehicle perspective, and could not be sustained for more that a handful of days to avoid vehicle battery depletion. Even leaving aside the power drain that would result from constantly running the LF transmitter, given that an average user would approach a vehicle at around 1.6 metres per second, the use of the LF field to provide enhanced functionality would not provide enough time to deploy such enhanced features before the user reached the vehicle.

Similarly, a strategy where the key fob periodically pulses to inform the vehicle of its approach, would deplete its own battery prematurely.

Figure 4:
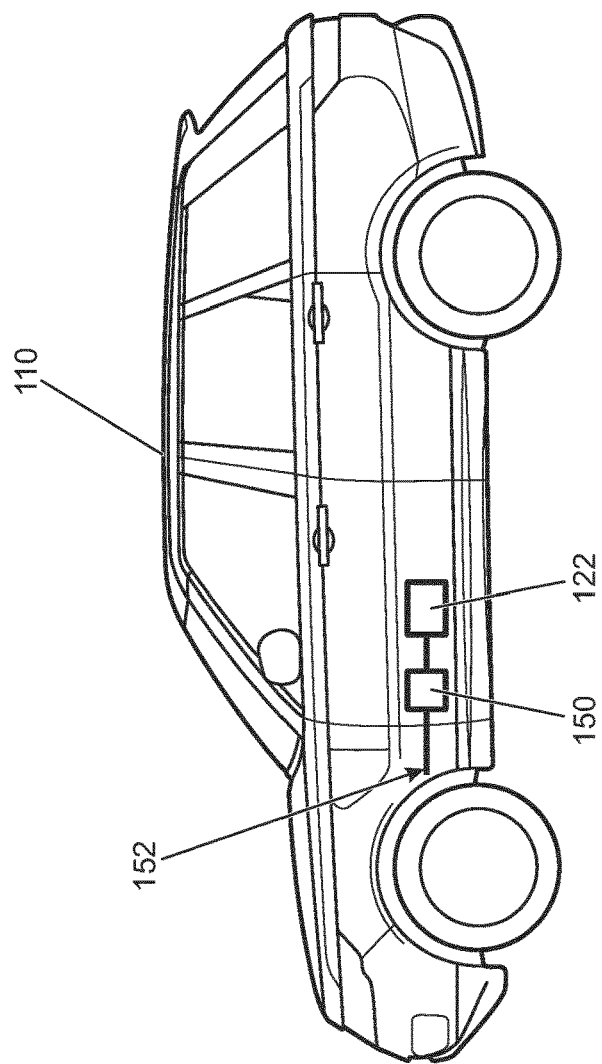
FIG. 4 illustrates a vehicle access system in accordance with an embodiment of the present invention.
Figure 4:
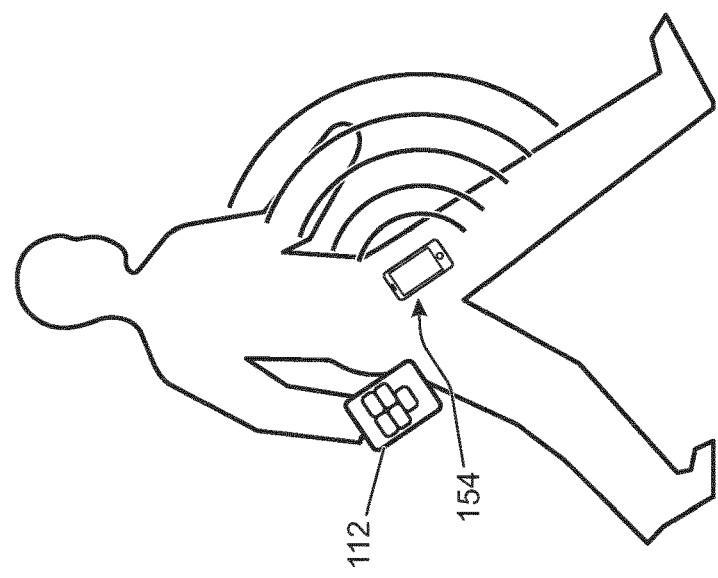

FIG. 4 shows a vehicle 110 equipped with a passive access system in accordance with an embodiment of the present invention. In the vehicle 110 of FIG. 4, a control unit 122 (also labelled as RFA for Remote Function Actuator in FIG. 5) is additionally in communication with a Bluetooth® transceiver 150. The Bluetooth® transceiver 150 is arranged to receive Bluetooth® signals via an antenna 152 that are transmitted from Bluetooth® devices in the vicinity of the vehicle 110. The control unit 122 comprises a processor 124.

The presence of the Bluetooth® transceiver 150 thereby enables the vehicle to additionally communicate with the user's Bluetooth®-enabled mobile device 154. The receipt of such Bluetooth® communications from the mobile device 154 enables the vehicle to be informed of the likely approach of a known vehicle user as described below without the need to either pulse the LF transmitters on the vehicle or the RF transmitter in the key fob.

Figure 5:
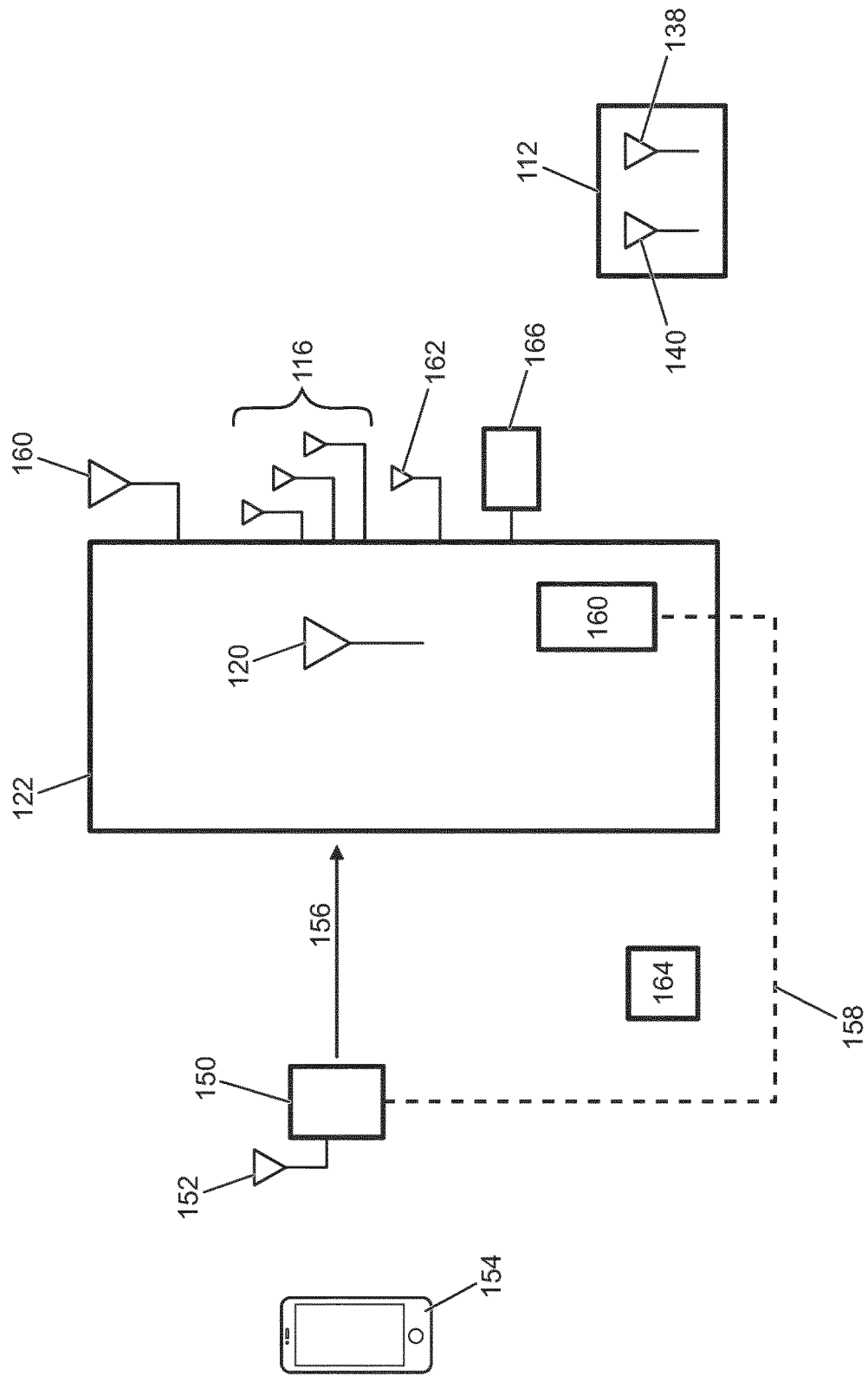
FIG. 5 shows the components of the vehicle access system of FIG. 4.

FIG. 5 shows a schematic of the vehicle access system within the vehicle 110. As can be seen in FIG. 5 the Bluetooth® transceiver 150 is in communication with the control unit 122 such that two-way communication with other Bluetooth® enabled devices (for example a smart device such as a smart phone, tablet or smart watch etc.) can be made between the vehicle and such devices.

A secondary communications path 158 is also shown between the transceiver 150 and a Local Interconnect Network (LIN) bus communication module 160. Such a secondary path 158 may provide for a one way communication path from the transceiver 150 to the mobile device 154 in order to display messages on a display screen of the device 154.

As shown in FIG. 5 the vehicle comprises a number of LF antennas 116, e.g. in the front doors and also in the bumper/boot door. Additional LF antennas (160, 162) may be located within the vehicle in order provide in-vehicle functionality and within the front bumper to provide access to the engine compartment or an electric-vehicle charging port.

The immobiliser antenna unit module 164 provides a backup start mechanism for use in the event that the battery 130 within the key fob 112 has failed.

The control unit 122 is arranged to generate control signals to control vehicle systems, e.g. the door latch mechanism 166.

Figure 6:
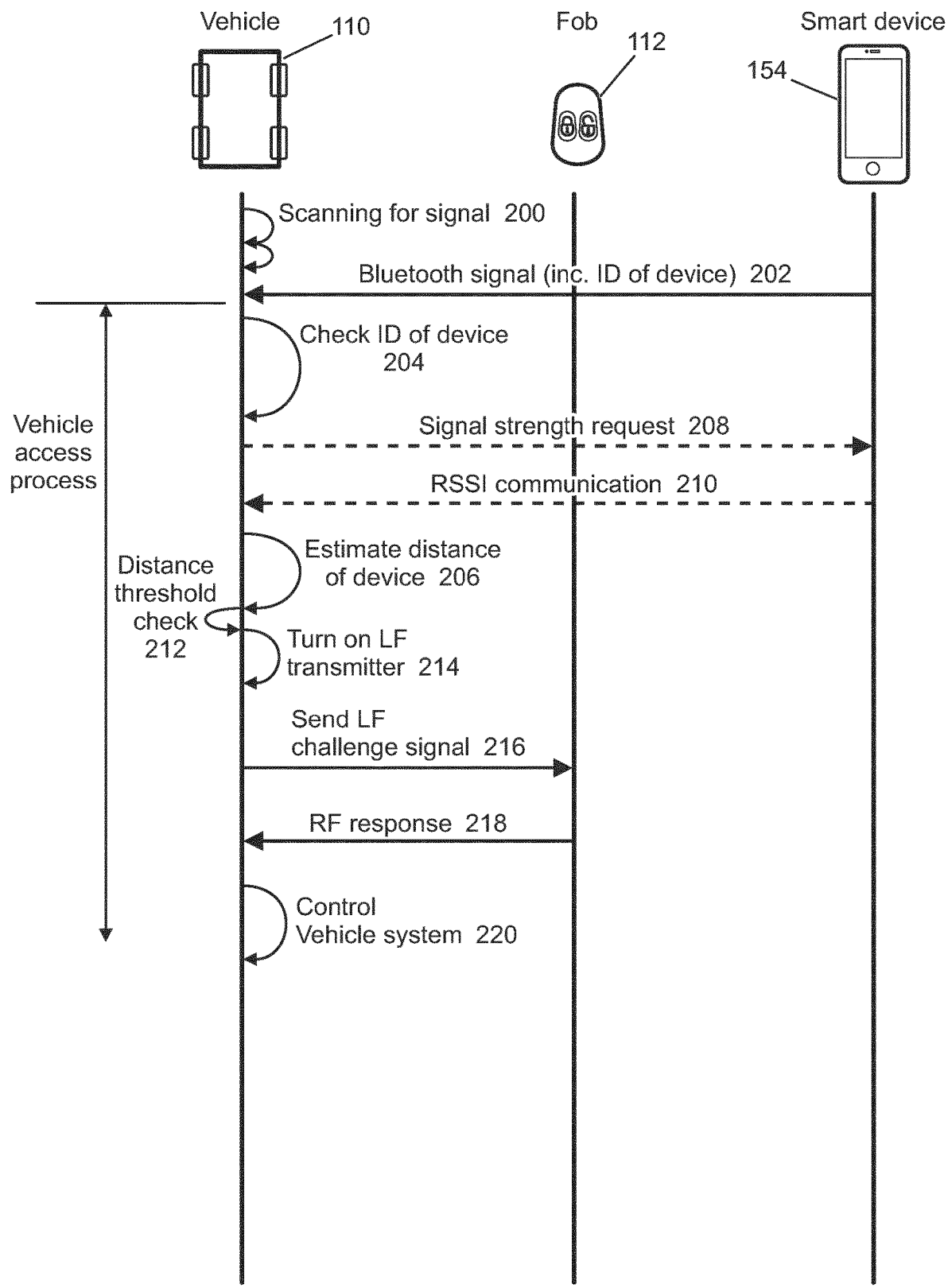
FIG. 6 shows the communication flow within the vehicle access system of FIGS. 4 and 5.

FIG. 6 illustrates the operation of a vehicle access system in accordance with an embodiment of the present invention.

In step 200 the vehicle 110 polls/scans for a first communications signal from the user's mobile device 154. The mobile device represents a first communications device in the present method of operation which is communicating over a first communications channel, e.g. a Bluetooth® channel. It is noted that the Bluetooth® 4.0 protocol is a low energy communications protocol that represents a low energy drain on the vehicle's battery. It is further noted that the present method of operation may comprise a separate pairing process between the mobile device 154 and the vehicle 110 to the pairing process that occurs when a user pairs their device for use with the vehicle's media systems.

In step 202 the first communications signal is received at the antenna 152 and transceiver 150. In the embodiment of FIGS. 4 to 6 this represents a Bluetooth®-enabled mobile device 154 entering the range of the Bluetooth® transceiver 150 within the vehicle. It is noted that such signals may be detectable up to 50 metres from the vehicle, depending on obstacles that may be in the way such as buildings, other vehicles, vegetation etc.

Following reception of the first communication signal (if the processor 124 is performing step 204), the processor 124 may initiate a vehicle access process comprising the following steps.

In step 204 a check is performed to determine if the mobile device 154 corresponds to a known device.

[It is noted that processing step 204 may be carried out within the transceiver 150 or within the control unit 122. In this instance that the transceiver 150 is performing step 204, then the processor 124 may initiate the vehicle access process from step 206 onwards.]

In step 206 an estimate of the distance of the mobile device 154 from the vehicle 110 is determined by the processor 124. In some deployment configurations the vehicle access process may be paused until the mobile device 154 is determined to be within a range of 6 to 8 metres from the vehicle 110.

It is noted that the received signal strength indication (RSSI) of the communication signal received in step 202 may be used to determine the distance of the mobile device 154. Alternatively, the vehicle may send a signal strength request 208 to the mobile device 154 to request that the mobile device 154 returns the RSSI of the vehicle's signal transmissions. An RSSI communication 210 may then be returned to the vehicle 110 by the mobile device 154 to allow the vehicle-device distance to be estimated.

It is noted that in some implementations the vehicle may use both the signal received in step 202 and the communication received in step 210 to estimate in step 206 the vehicle to mobile device 154 distance.

In step 212 the estimated vehicle-device distance is compared, by the processor 124, to a threshold value (e.g. a threshold set in the range 6 to 8 metres) and in the event that the device 154 is determined to be close enough to the vehicle then, in step 214, the vehicle's LF transmitters 114, 116 are turned on.

In step 216 an LF challenge signal is sent from the vehicle to a second communications device (the key fob 112) and in step 218 an RF response is received from the key fob 112. It is noted that the LF challenge signal sent in step 216 is sent on a difference communication channel to the Bluetooth® signals received in step 202 and sent/received in step 208/210.

In the event that the response signal received in step 218 allows the key fob to be identified and validated as the correct key fob 112 for the vehicle then the processor 124 within the control unit 122 may control a vehicle system in step 220. Without limitation, the vehicle system may comprise a lock system of the vehicle, a vehicle lighting system, deployable vehicle door handles, vehicle meet & greet features and/or a vehicle personalisation system.

It is noted the above process is described in relation to a user approaching a vehicle. However, a similar process may occur if the processor 124 within the control unit 122 detects that the user may be leaving the vehicle. In such a scenario the processor 124 within the control unit 122 may register that the vehicle engine has been turned off or that the driver door has been opened and may again start scanning for a Bluetooth® signal (step 200). The received signal (202) may then again be authenticated (step 204) and in step 206 the departure of the user may be determined as the vehicle-device distance increases. The LF antenna may again be switched in order to confirm that the user has left the LF field. At this point the vehicle doors may be locked. A vehicle lock confirmation message may then be sent to the user device over the first (Bluetooth®) communication channel.

Many modifications may be made to the above examples without departing from the scope of the present invention as defined in the accompanying claims.

The invention claimed is:

1. A method of operating an access system for a vehicle, the method comprising:
   scanning for a first communication signal from a first communications device using a first communication channel of a first communications system; and
   initiating a vehicle access process based on detecting the first communication signal from the first communications device;
   wherein the vehicle access process comprises:
      comparing a received signal strength indication, RSSI, of the received first communication signal to a predetermined threshold signal strength value;
      sending a challenge signal for a second communications device using a second communication channel of a second communications system in the event that the RSSI of the received first communication signal exceeds the threshold signal strength value; and
      controlling the vehicle access system based on a response signal received from the second communications device, the response signal having been sent in response to the challenge signal.

2. A method as claimed in claim 1, wherein the second communications device is configured to allow a user to gain access to a vehicle.

3. A method as claimed in claim 1, further comprising identifying a device identifier for the first communications device from the first communication signal and checking if the device identifier corresponds with that of an approved device.

4. A method as claimed in claim 3, further comprising turning on a transmitter for transmitting the challenge signal via the second communication channel in the event that the first communications device is an approved device.

5. A method as claimed in claim 4, wherein the transmitter comprises a Radio Frequency, RF, transmitter and the second communications channel comprises an RF channel.

6. A method as claimed in claim 5, wherein the transmitter comprises a Low Frequency, LF, transmitter and the second communications channel comprises an LF channel.

7. A method as claimed in claim 1, further comprising sending a signal strength request signal to the first communications device over the first communication channel and receiving a signal strength confirmation communication signal from the first communications device over the first communications channel, the signal strength confirmation communication signal comprising a signal strength value of the signal strength request signal as received at the first communications device.

8. A method as claimed in claim 7, further comprising comparing the signal strength value to a predetermined threshold signal strength value.

9. A method as claimed in claim 8, further comprising sending the challenge signal for the second communications device in the event that the signal strength value exceeds the threshold signal strength value.

10. A method as claimed in claim 1, wherein the vehicle is provided with multiple antennas for receiving communication signals sent over the first communication channel, the method further comprising comparing the signal strength of signals received from the first communications device at two or more of the antennas to determine an approach vector for the first communications device.

11. A method as claimed in claim 10, further comprising turning on a transmitter for transmitting the challenge signal on the side of the vehicle that the first communications device is approaching.

12. A method as claimed in claim 1, comprising cancelling the vehicle access process in the event that no response signal is received from the second communications device.

13. A method as claimed in claim 1, comprising determining that the first communications device is moving away from the vehicle in dependence on one or more changes in the signal strength of signals received over the first communications channel from the first communications device.

14. A method as claimed in claim 13, further comprising turning on an RF transmitter in order to determine if the second communications device is moving away from the vehicle.

15. A method as claimed in claim 14, further comprising locking the vehicle in the event that either or both of the first and second communications devices have left the vicinity of the vehicle.

16. A control unit arranged to control an access system for a vehicle, the control unit comprising:
one or more inputs for receiving a first communication signal from a first communications device and a second communication signal from a second communications device;
a processor arranged to manage a vehicle access process; and
an output arranged to output vehicle access control signals;
wherein the processor is arranged to:
scan for a first communication signal from a first communications device using a first communication channel of a first communications system;
initiate a vehicle access process based on detecting the first communication signal from the first communications device, the vehicle access process comprising comparing a received signal strength indication, RSSI, of the received first communication signal to a predetermined threshold signal strength value and, in the event that the RSSI of the received first communication signal exceeds the threshold signal value, sending from the output a challenge signal for a second communications device using a second communication channel of a second communications system; and
wherein the output is arranged to output a vehicle access control signal to control the vehicle access system based on a response signal received from the second communications device, the response signal having been sent in response to the challenge signal.

17. An access system for a vehicle comprising a control unit as claimed in claim 16, a first antenna arranged to operate over the first communication channel and a second antenna arranged to operate over the second communication channel.

18. A vehicle comprising a control unit as claimed in claim 16.

19. A non-transitory computer-readable medium having stored thereon a computer program product comprising instructions which, when the program is executed by a computer, cause the computer to carry out the method of claim 1.

* * * * *